May 5, 1953  A. P. FOX ET AL  2,637,413
LUBRICANT INJECTOR
Filed April 22, 1950

Alexander P. Fox,
Carl H. Mueller,
Inventors,
Haynes and Koenig,
Attorneys.

UNITED STATES PATENT OFFICE 2,637,413

LUBRICANT INJECTOR

Alexander P. Fox, University City, and Carl H. Mueller, St. Louis, Mo., assignors to Lincoln Engineering Company, St. Louis, Mo., a corporation of Missouri Application April 22, 1950, Serial No. 157,562

2 Claims. (Cl. 184—7)

This invention relates to lubricant injectors, and more particularly to lubricant injectors for use in pressure lubricating systems.

This invention pertains to injectors of the type shown in U. S. Patents 2,122,177, 2,141,022, 2,155,250, 2,283,638 and 2,448,583, and its object is the provision of an improved simplified injector of this type.

In general, an injector of this invention comprises an injector body having a lubricant discharge chamber which opens at one end into an enlarged opening, with an annular shoulder at the inner end of the opening. A special check valve is provided in this opening. This check valve, according to the invention, consists of a one-piece body molded of soft, resilient material having a base seated against the shoulder and a nipple projecting outwardly from the center of the base, with an opening or passage through the base into the nipple, the latter being transversely slit to provide a port through the nipple from the opening or passage. The valve is held in the opening by means which compresses the base of the valve against the shoulder to provide a seal. A plunger is reciprocable in the discharge chamber and is movable through a pressure stroke to discharge lubricant from the discharge chamber through the valve. The passage through the base of the valve is of smaller cross-section than the working end of the plunger so that the base of the valve presents a seat at said one end of the discharge chamber for cushioned sealing engagement by the working end of the plunger at the end of its pressure stroke. With this arrangement, the valve has at least three functions in addition to its function as a check valve: (1) It provides its own seal; (2) it acts as a cushion receiving the impact of the plunger when the plunger is driven through a pressure stroke and (3) the base of the valve is utilized as a valve seat for engagement by the working end of the plunger to seal against leakage of lubricant past the plunger and out through the check valve. Other features will be in part apparent and in part pointed out hereinafter.

The invention accordingly comprises the elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a view in elevation of an injector of this invention mounted in a manifold, the latter being shown in section;

Similar reference characters indicate corresponding parts throughout the several views of the drawing.

Figure 1:
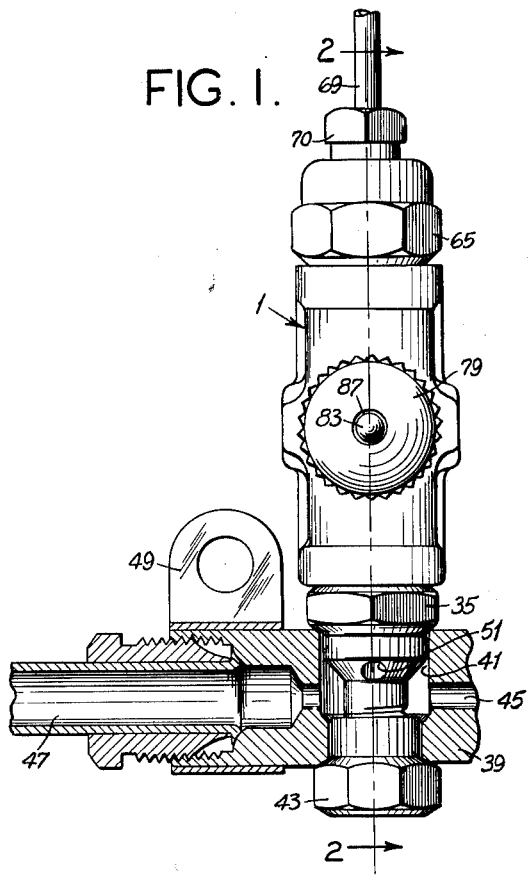

Referring to the drawing, an injector of this invention is shown to comprise an injector body 1 formed to provide a first cylinder 3 and a second cylinder 5 at right angles to one another. As herein illustrated, the body 1 is made in one piece in the form of a T, the head of the T being the first cylinder 3 and the stem of the T being the second cylinder 5. The cylinder 3 has a bore 7 and enlarged openings 9 and 11 at its upper and lower ends as viewed in Fig. 2. These may be readily provided by boring through the head of the T and counterboring its ends. The cylinder 5 has a bore 13 which extends from its outer end toward but terminates short of the bore 7 of cylinder 3 so as to provide a shoulder 15 at the inner end of the cylinder 5. A smaller bore 17 at the inner end of the cylinder 5 forms a transfer port establishing communication between the cylinders 3 and 5.

A plunger 19 has a sliding fit at its upper end in the bore 7. This bore constitutes the discharge chamber of the injector and will be hereinafter referred to as such. The plunger extends down from the discharge chamber 7 through the opening 11 and is contained by a fitting 21 threaded in the opening 11. The fitting 21 has a chamber 23 which is open at its upper end. This chamber 23 constitutes the inlet chamber of the injector and receives the plunger 19. The chamber 23 is large enough to accommodate a helical compression spring 25 surrounding the plunger and reacting from the shoulder 27 at the upper end of the opening 11 against a collar 29 on the plunger adjacent its lower end. The spring 25 biases the plunger downward to a retracted position determined by the engagement of the lower end of the plunger with the bottom of the chamber 23. The plunger has an axial passage 30 from its lower end up to a cross-passage 31 adjacent its upper end leading to a peripheral groove 33. The plunger is adapted to move upward to a position wherein the groove 33 registers with the transfer port 17.

The fitting 21 has a hexagonal head 35 and a reduced-diameter stud 37 extending down at its lower end. It is adapted for mounting in a lubricant manifold 39 in the manner illustrated in Figs. 1 and 2. As shown, the manifold consists of a block having a vertical opening 41 receiving the lower portion of the fitting below the head 35, a cap nut 43 being threaded on the stud 37 in the lower end of the opening 41 to hold the injector in sealed assembled relation with the manifold. The manifold has a longitudinal lubricant passage 45 and is supplied with lubricant from a source of supply through a lubricant supply line 47. The manifold, which is fragmentarily shown in Fig. 1, is of a type adapted to receive a plurality of injectors side-by-side, and is supported by a bracket 49. In the fitting 21 below its head 35 is an inlet port 51 providing for communication between the manifold and the chamber 23.

Figure 3:
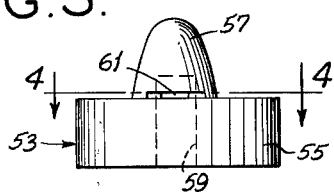
Fig. 3 is an elevation of a check valve per se of the injector.
Figure 4:
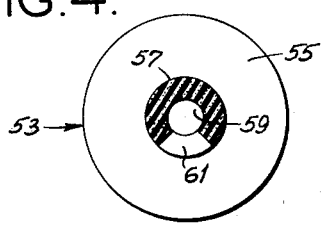
Fig. 4 is a horizontal section taken on line 4—4 of Fig. 3.

The plunger 19 is adapted to move upward through a pressure stroke to a limiting position determined by engagement of its upper or working end with a special check valve member 53, which constitutes an important feature of this invention. As shown, the check valve member 53 consists of a one-piece molded body, of rubber or the like, and preferably an oil and grease resistant synthetic rubber such as Hycar, a butadiene copolymer with acrylonitrile, having a flat base 55 with a nipple 57 projecting from the upper face of the base in the direction of flow of lubricant. The valve is formed with an opening or passage 59 through the base into the nipple, the latter being transversely slit as indicated at 61 where it joins the base over part of its periphery (about 45° as shown in Figs. 3 and 4), to provide a port through the nipple from the opening or passage 59. As herein illustrated, the base 55 of the valve is in the form of a disc of such diameter as to fit in the upper opening 9 of the injector body 1. The passage 59 is of smaller cross-section than the working end of the plunger 19.

The valve 53 is fitted in the opening 9 with its base engaged against the flat shoulder 63 at the bottom of the opening 9 and with the nipple 57 projecting upward. The valve is retained in the opening by a gland 65 threaded in the opening and compressing the base of the valve against the shoulder 63 to provide a seal. The gland has an axial passage 67 receiving the nipple. This passage is the outlet of the injector and is adapted to have a lubricant line 69 connected into it by a fitting 70.

A piston 71, consisting of a disc of rubber, preferably an oil and grease resistant synthetic rubber such as above mentioned, is slidable in the cylinder 5. This piston is backed by a follower 73 which consists of a hollow cylinder slidable in the cylinder 5, closed at its inner end engaged with the piston 71 and open at its outer end. The cylinder 5 is externally provided with a raised screw thread 75 which terminates short of the cylinder 3 so as to provide an annular groove 77 between the inner end of the thread 75 and the cylinder 3. Adjustably threaded on the thread 75 is a cap 79. After the cap is threaded on, an inwardly directed flange 81 is formed at its inner end which reaches into the groove 77 to prevent removal of the cap while allowing for its axial adjustment between the solid and dotted line positions shown in Fig. 2. At 83 is shown a stem having a head 85 backing the closed end of the cylindrical follower 73. The stem extends out of the follower and through an opening 87 in the head of the cap 79. The opening 87 is smaller than the diameter of the follower 73. A helical compression spring 89 surrounding the stem reacts from the head of the cap against the head 85 on the stem to bias the stem, follower 73 and piston 71 toward the cylinder 3.

Figure 2:
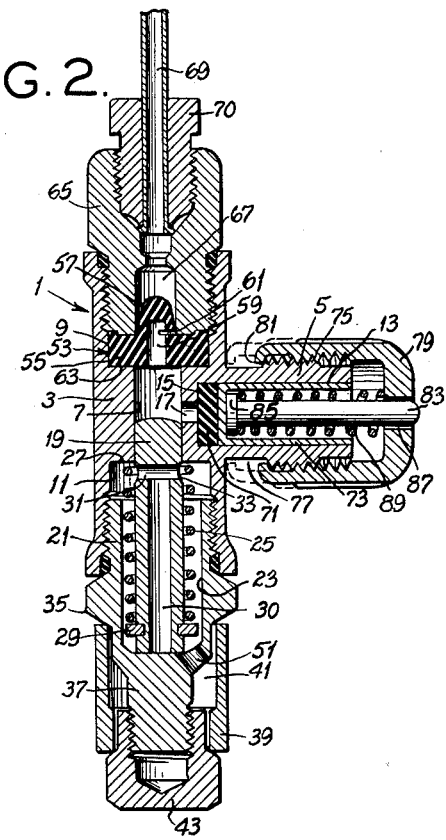
Fig. 2 is a full vertical section taken on line 2—2 of Fig. 1.

Operation of the above-described injector is as follows:

The cap 79 is adjusted to a position such as illustrated in solid lines in Fig. 2. With the cap in such position, the piston 71, follower 73 and stem 83 can move to the right (as viewed in Fig. 2) until the outer end of the follower 73 engages the inside of the head of the cap 79. Fig. 2 illustrates the parts in the positions they occupy when the lubricant supply line 47, manifold 39 and injector inlet chamber 23 are vented to relieve the pressure of lubricant in the lubricating system. Under these circumstances, the plunger 19 is in its lower retracted position and piston 71 is in its forward advanced position engaging the shoulder 15. Assuming that the injector has been primed and previously cycled, there will be a measured charge of lubricant in the discharge chamber above the upper end of the plunger 19.

Upon development of pressure in the lubricant supply line, the manifold and the injector inlet chamber 23, the plunger 19 is subjected to force tending to raise it against the bias of spring 25. When this force reaches injector-cycling value (600 to 1000 p. s. i., for example) the plunger 19 is driven upward until its upper end engages the bottom of the valve 53. The latter acts as a cushion for the impact. This forces charge of lubricant from the chamber 7 through the passage 59 and slit 61 in the check valve 53 and out through the line 69. It also brings the annular groove 33 into registry with the transfer port 17. Lubricant thereupon flows from the chamber 23 through the axial passage 30 in the plunger and through the cross-passage or radial port 3 into the groove 33 and through the transfer port 17 into the cylinder 5, forcing the piston 71 back until the follower 73 engages the inside of the head of the cap 79. Thus, the cylinder 5 receives a charge of lubricant, the amount of the charge depending upon the displacement of the piston 71, which is in turn dependent upon the position of the cap 79. Stem 83 protrudes from the cap 79 and acts as a telltale to apprise the operator that the injector has cycled. It will be here understood that by varying the adjustment of the cap, the injector may be set to inject different measured charges of lubricant. It will be seen that the cylinder 5 serves as a measuring chamber and may be referred to as such.

When the plunger 19 is driven upward to the upper limit of its stroke by pressure in chamber 23, its upper end comes into sealing engagement with the bottom seat portion of the valve 53 presented at the upper end of the discharge chamber 7, the plunger being held by the pressure tending to drive the plunger upward. Thus, when the plunger is driven upward to the end of its pressure stroke it seals the passage 59 in the valve 53 and thus prevents escape through passage 59 of any lubricant that may leak upward past the plunger. As shown in Fig. 2, the upper end of the plunger may be made convex to insure this sealing action. This is important, particularly where the injector is to deliver relatively small measured charges, because without such a seal, should lubricant leak past the plunger there would be a more or less continuous flow of lubricant from the injector during the interval in which injector-cycling pressure is developed in the chamber 23. With the arrangement wherein the upper end of the plunger engages the resilient valve 53, the injector maintains close control over the amount of lubricant injected, even though the plunger 19 is allowed ample tolerance for readily sliding in the bore 7.

Upon subsequent relief of pressure in the lubricant supply line 47, manifold 39, and injector inlet chamber 23, the spring 25 drives the plunger 19 down to its retracted position illustrated in Fig. 2. Spring 89 thereupon acts to drive the piston 71 to its forward position against shoulder 15, thus forcing the measured charge of lubricant from the cylinder or measuring chamber 5 into the discharge chamber 7 above the upper end of the plunger 19. The injector is thus re-charged and re-set for the next cycle.

It will be noted that in the retracted position of the plunger 19, its upper end face is just clear of the transfer port 17 and its annular peripheral groove 33 is just below the shoulder 27 at the lower end of the bore or discharge chamber 7. As the plunger moves upward, it crosses and blocks the transfer port 17 and forces the charge in the discharge chamber 7 out through the check valve 53. The latter opens under pressure in its passage 59 by bending of the nipple 57 to open up the slit 61. It closes by back pressure in the outlet forcing the nipple toward the base 55 to close the slit. It is important that in the advanced posiion of the plunger at the end of a pressure stroke, the groove 33 registers with the transfer port. The upward movement of the plunger is limited by the engagement of its upper end with the bottom of the valve 53 and, accordingly, the groove 33 is spaced from the upper end of the plunger a distance corresponding to the spacing of the bottom of the valve and the port 17.

The injector of this invention, as will be seen from the drawing and the above description, is an improvement upon prior injectors of the same class in being small, compact and rugged, of simplified construction and easily installed. The use of the simple check valve 53 is a feature of considerable importance as this valve is in itself simple and economical to manufacture, which is easily installed and replaced when necessary, which provides its own packing, and which also acts both as a valve seat and as a cushion for the plunger.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. In a lubricant injector, an injector body having a discharge chamber opening at one end into an enlarged outlet opening, with an outwardly facing shoulder at the inner end of the outlet opening, a check valve in the outlet opening comprising a one-piece body of soft resilient material having a base seated on the shoulder and a nipple projecting from the outer face of the base, the valve having a passage through the base into the nipple and the latter being transversely slit over part of its periphery to provide a port through the nipple from the passage, means holding the base of the valve against the shoulder, and a plunger reciprocable in the discharge chamber and movable through a pressure stroke to discharge lubricant from the discharge chamber through the valve, the passage through the base of the valve being of smaller cross-section than the working end of the plunger so that the base of the valve presents a seat at said one end of the discharge chamber for cushioned sealing engagement by the working end of the plunger at the end of its pressure stroke.

2. In a lubricant injector, an injector body having a discharge chamber opening at one end into an enlarged cylindrical outlet opening, with an outwardly facing annular shoulder at the inner end of the outlet opening, a check valve in the outlet opening comprising a one-piece molded body of elastomeric material having a disc portion seated on the shoulder and a nipple projecting centrally from the outer face of the disc portion, the valve having a passage through the disc portion into the nipple, the nipple being transversely slit where it joins the disc portion over part of its periphery to provide a port through the nipple from the passage, a gland threaded in the outlet opening marginally compressing the disc portion against the shoulder, and a plunger reciprocable in the discharge chamber and movable toward the valve through a pressure stroke to discharge lubricant from the discharge chamber through the valve, the passage through the disc portion being of smaller cross-section than the working end of the plunger so that the disc portion presents a seat at said one end of the discharge chamber for cushioned sealing engagement by the working end of the plunger at the end of its pressure stroke.

ALEXANDER P. FOX.
CARL H. MUELLER.

References Cited in the file of this patent

UNITED STATES PATENTS

| Number | Name | Date |
|---|---|---|
| 1,942,096 | Hallerberg | Jan. 2, 1934 |
| 1,988,152 | Battle | Jan. 15, 1935 |
| 2,296,861 | Matter | Sept. 29, 1942 |
| 2,448,583 | Fox | Sept. 7, 1948 |